United States Patent [19]

Noakes

[11] 3,960,756

[45] June 1, 1976

[54] HIGH EFFICIENCY SCINTILLATION DETECTORS

[75] Inventor: John E. Noakes, Athens, Ga.

[73] Assignee: Bicron Corporation, Cleveland, Ohio

[22] Filed: Aug. 16, 1974

[21] Appl. No.: 497,915

Related U.S. Application Data

[63] Continuation-in-part of Ser. No. 257,755, May 30, 1972, abandoned.

[52] U.S. Cl. ............................ 252/301.18; 250/367; 252/301.17; 252/301.36
[51] Int. Cl.² ..................... C09K 11/12; G01T 1/20
[58] Field of Search ............. 252/301.2 C, 301.3 R, 252/301.2 R, 301.2 SC; 250/367

[56] References Cited
UNITED STATES PATENTS

| | | |
|---|---|---|
| 2,559,219 | 7/1951 | Ludeman .................. 252/301.2 SC |
| 2,650,309 | 8/1953 | Webb et al. ......................... 250/367 |
| 2,745,967 | 5/1956 | Ludeman .................. 252/301.2 SC |
| 2,853,620 | 9/1958 | Fox et al. ............................ 250/367 |
| 2,985,593 | 5/1961 | Broderick et al. .......... 252/301.2 SC |
| 3,835,325 | 9/1974 | Fishman .......................... 250/367 X |

OTHER PUBLICATIONS

J. Sharpe, "Nuclear Radiation Detectors," Methuen, London, pp. 140–143.

*Primary Examiner*—John H. Mack
*Assistant Examiner*—Aaron Weisstuch

[57] ABSTRACT

A scintillation counter consists of a scintillation detector, usually a crystal scintillator optically coupled to a photomultiplier tube which converts photons to electrical pulses. The photomultiplier pulses are measured to provide information on impinging radiation. In inorganic crystal scintillation detectors to achieve maximum density, optical transparency and uniform activation, it has been necessary heretofore to prepare the scintillator as a single crystal. Crystal pieces fail to give a single composite response. Means are provided herein for obtaining such a response with crystal pieces, such means comprising the combination of crystal pieces and liquid or solid organic scintillator matrices having a cyclic molecular structure favorable to fluorescence.

8 Claims, 6 Drawing Figures

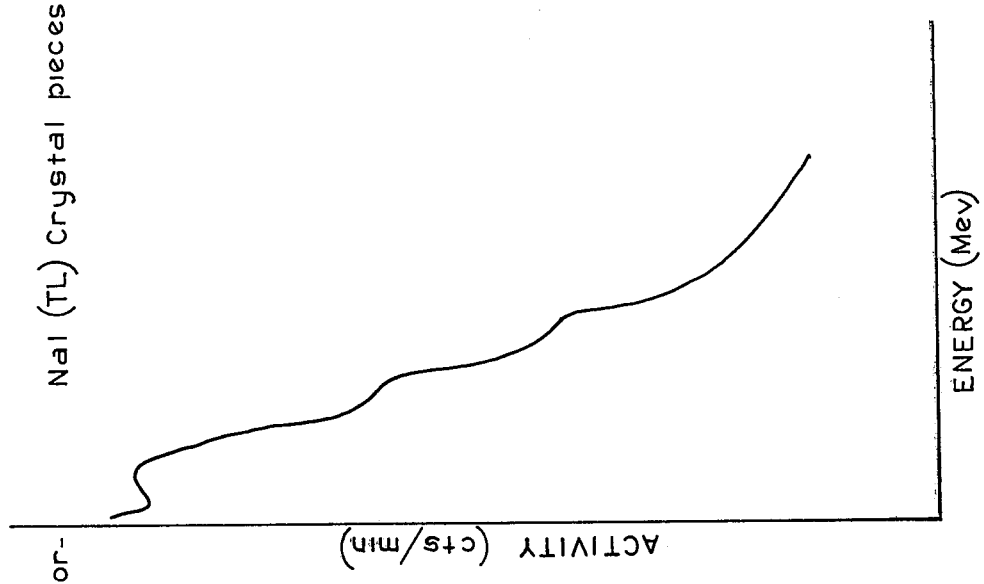
FIG. 3  NaI (TL) Crystal pieces
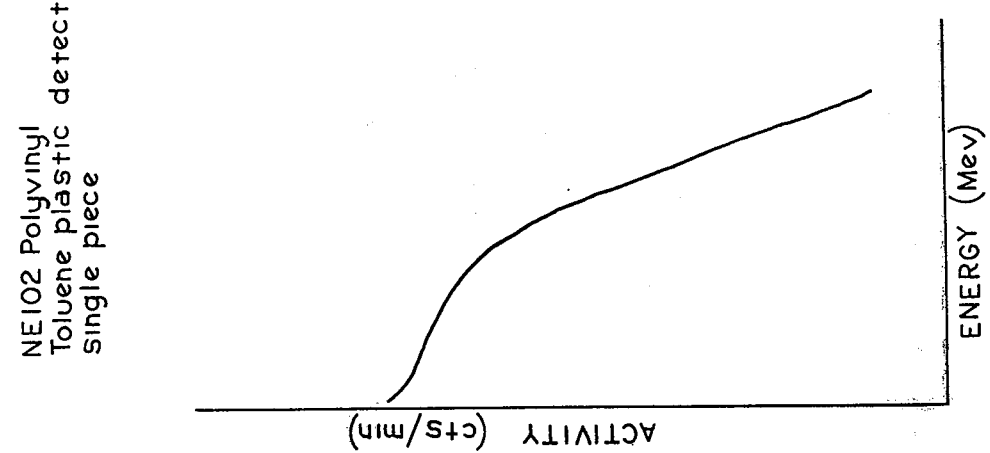
FIG. 2  NE102 Polyvinyl Toluene plastic detector- single piece
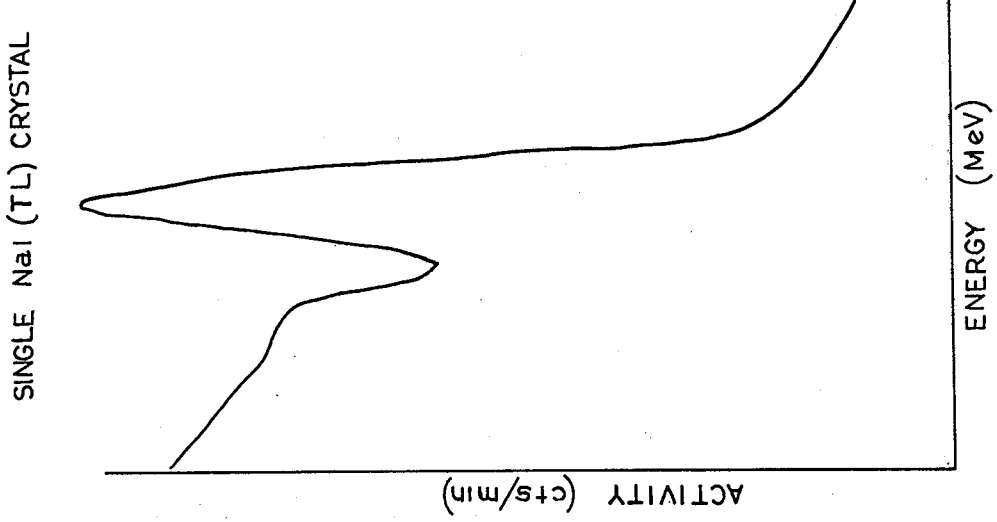
FIG. 1  SINGLE NaI (TL) CRYSTAL

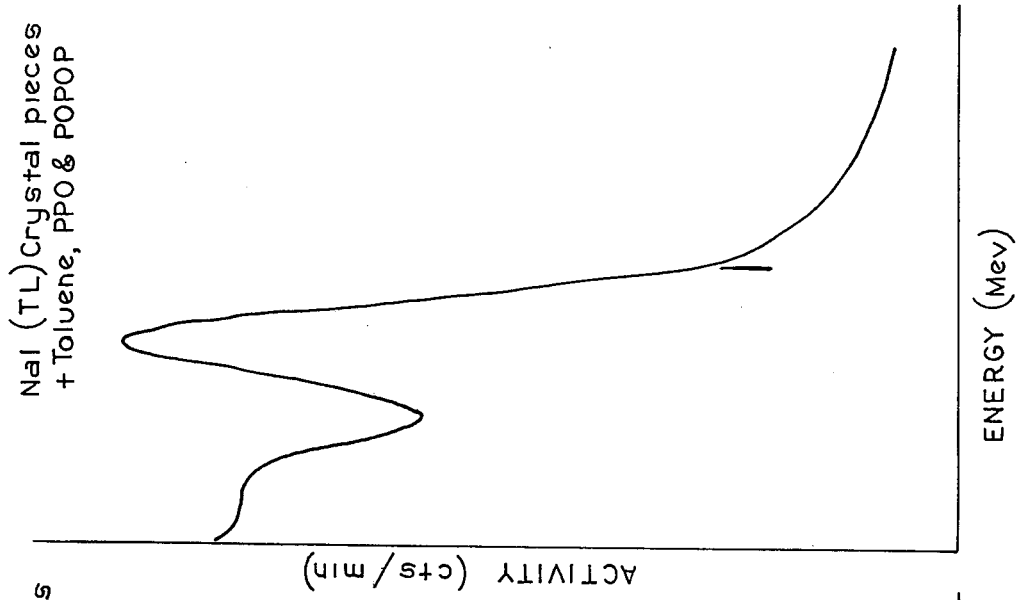
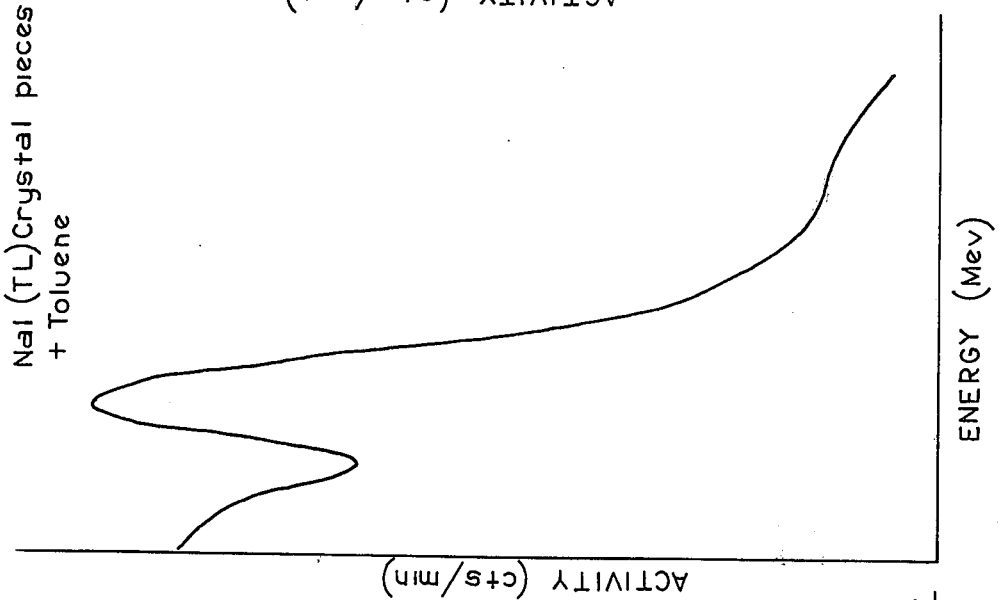
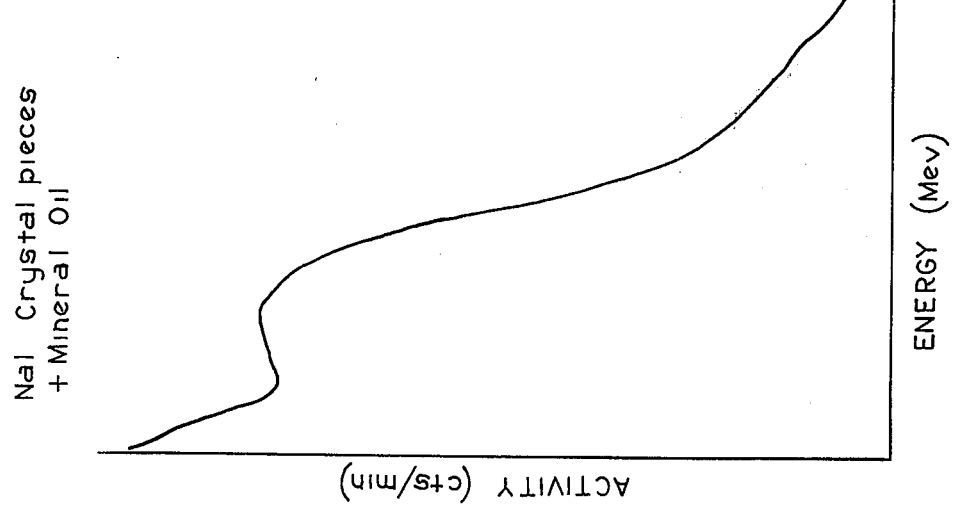

HIGH EFFICIENCY SCINTILLATION DETECTORS

CROSS REFERENCE TO RELATED APPLICATION

This application is a continuation-in-part of my earlier filed U.S. Pat. application Ser. No. 257,755, filed May 30, 1972, abandoned.

BACKGROUND OF THE INVENTION

Scintillating counters are important tools for studying nuclear radiation. Nuclear radiation can be made up of energetic particles possessing mass and charge such as alpha and beta radiation. Radiation can also be in the form of particles having mass and no charge such as neutrons, or as particles with no mass or charge such as gamma rays. All of these forms of radiation interact with matter at the atomic level.

A scintillation counter consists of a scintillation detector usually in the form of a solid or liquid material which produces a flash of light upon excitation by incident radiation. The scintillating material is optically coupled to a photomultiplier tube which converts the photons to electrical pulses whose magnitude is proportional to the intensity of the initial light flashes. This, in turn, is proportional to the toal energy dissipated by the radiation energy in the detector. The photomultiplier pulses may be measured to provide information on the impinging radiator.

In the case of alpha, beta and gamma radiation, interaction with matter results in disturbing the electron level of an atom with which it comes in contact. Electrons only slightly disturbed can be raised to higher energy levels. Electrons involved in direct interaction can be released from their electronic field with high kinetic energy, resulting in the formation of an ion pair. These high energy electrons dissipate their energy by interaction and excitation of other electrons of neighboring atoms. The net result is that the disturbed and released electrons return to ground state or normal energy levels and release their kinetic energy as photons. The electrons produced from the total capture of an incident nuclear radiation within a crystal detector are referred to as photoelectrons. They represent the highest level of response of the detector. Radiation energy only partially retained by the detector results in the production of lower energy electrons called Compton electrons. The energy of these electrons is lower than that of photoelectrons and ranges over a complete energy spectrum.

A great deal of work has gone into finding good scintillating compounds of which the superior ones are more generally referred to as phosphors. The physical properties which are most often associated with phosphors are: (1) the ability to convert a large fraction of the incoming radiation to excited energy which is released as photon energy, (2) emitted photon energy possessing a wavelength of maximum spectral sensitivity to the phototube, (3) photon emission of short duration to allow discrete radiation energy to be measured at high incident intensity, and (4) a phosphor having good optical properties to permit the photon energy to be transmitted. Since no one phosphor has all of these properties, one must choose a phosphor for the type of radiation to be detected.

Scintillators may be inorganic or organic in nature. Inorganic scintillation crystals are well known and include $CaWO_4$, $MgWO_4$, $LiAlSi_2O_6$, LiF, $CdB_4O_7$, ZnO, CdS-Cu, CdS-Ag, ZnS-Cu, and ZnS-Ag. The inorganic scintillation crystals which are presently most used in nuclear radiation detectors are the alkali metal halide crystals activated by the inclusion of thallium. These crystals are preferred herein. Such crystals are NaI(Tl), NaBr(Tl), KBr(Tl), KI(Tl), KCl(Tl) and the like with NaI(Tl) preferred. The superior alkali metal iodide crystal phosphors used today contain approximately $10^{-1}$ mol percent of thallium as an impurity in the crystal lattice. It is believed that thallium in the crystal lattice acts as an impurity center which may be raised to an excited state either by absorption of photons, by capture of an exciton (defined as an electron hole in the crystal lattice) or by the successive capture of an electron and a hole. The importance of the thallium as an activator center is that it permits the excited energy to transcend otherwise forbidden energy levels of the crystal to the allowed levels which favor the scintillation process by photon emission during energy decay to ground state levels.

The scintillation process in organic liquid scintillators and solid organic compounds, known as plastic scintillators, is primarily a molecular response. As such, it is distinguished from inorganic solids whose luminescence is intimately associated with energy-bond structure of ionic crystals. Organic solids, i.e., plastic scintillators, are classified as molecular crystals where the intermolecular bonding is quite weak (Van der Waal forces) compared with bonding of ionic crystals. Photoluminescence in organic scintillators arises from de-excitation of the first excited electronic state. This excitation can occur when radiation energy excites and distorts the electronic cloud associated with an organic molecule. Molecules of cyclic nature such as benzene and benzene ring-type compounds exhibit excellent organic scintillation properties because they are easily excited due to their already high resonating energy state.

The choice of an inorganic crystal or an organic phosphor for nuclear radiation measurement by scintillation detectors thus depends on the type of radiation energy one wishes to measure and to what use the radiation measurements will be applied. In the measurement of gamma radiation one usually selects an inorganic crystal detector such as sodium iodide thallium activated crystals. There are two very important reasons for this selection. The first is that gamma radiation which possess no mass or charge but discrete energy is not highly interactive with low density compounds such as organic phosphors, but is more efficiently detected with the high density inorganic crystals. Another way of stating this would be to say that gamma rays are not reactive with the low mass carbon and hydrogen atoms of organic phosphors but are reactive with the higher mass sodium and especially iodide ions in the crystal detectors. A second important feature about the inorganic crystal phosphor detectors and one that relates to their high efficiency for gamma ray interaction is that they permit total capture of many of the incident gamma rays which enables identification of the omitting radioisotopes. Therefore, the use of an inorganic crystal not only acts as an efficient detector but offers a means for identifying the source of gamma radiation through radiation energy measurement by total gamma ray capture (gamma ray spectroscopy).

Organic phosphor detectors have been used mainly for radiation detection of charged particles. Alpha and beta radiation having mass and charge are very interactive with low mass organic phosphors and can be effectively detected with even small volumes of organic phosphors. The stress for determining the energy level of incident radiation as stated for gamma ray spectroscopy is not as important for radiation energy such as beta particles which are not released at discrete energy levels but rather over a wide energy spectrum. Organic phosphors find their greatest use where phosphor detectors are not needed specifically for radiation energy measurement, but are used for charged particle detection and where detector configuration and cost are prime considerations in the scintillation system.

In order to achieve maximum density, optical transparency and uniform activation, it has been necessary heretofore to prepare the scintillator as a single crystal. Hence, probably the biggest drawback to the use of inorganic crystal detectors is their high cost, and the limited configuration and size to which the crystal detectors can be fabricated. The main reason for the high cost is that previous to this invention, a high efficiency and energy resolution detector (one that has high capability for capturing incident gamma radiation and measuring the total radiation energy) required a single crystal to be grown and fabricated into a detector. While large crystals have been grown and fabricated (>4,000cc) and cut to various sizes and shapes, their costs have been prohibitively high, and their detector configuration limited.

Attempts have been made in the past to utilize small quantities of broken or small crystals to overcome the difficulties and expense encountered in growing large, pure crystals. Thus, an article by R. D. Albert on page 1,096 in The Review of Scientific Instruments, Vol. 24, Dec., 1953, describes endeavors to use clusters of scintillation crystals as radiation detectors. The crystal pieces, composed of NaI(Tl) were immersed in a mineral oil so as to light couple the crystal pieces to each other for efficient photon transfer. The mineral oil was chosen with a like refractive index to that of the crystals and good optical transfer properties for the emitted photons. The crystal detector was not used for energy measurements as in gamma ray spectroscopy because it had very poor energy resolution capabilities for resolving and measuring the total capture radiation. This failing was due to the multiresponse of each of the crystals to the radiation. Failing to give a single composite response as is obtained in a single large crystal, the detector was used only as an anticoincidence shield to detect incident gamma radiation requiring no energy resolution measurements.

Another form of multicrystalline scintillator is described by Tarmer and Derstein in Nucleonics, 10, 1952. A multicrystalline mass was prepared by melting crushed crystals of stilbene in an aluminum mold and allowing the mold to cool. The advantage of this type of nuclear detector fabrication was that it was very inexpensive and allowed irregular configuration detectors to be quickly constructed. It, however, had the drawbacks of all organic detectors. Its low mass made it a poor detector for noncharged radiation such as gamma rays and an even poorer detector for making energy resolution measurements.

A recent attempt has been made to construct a multicrystalline nuclear detector called Polyscin I which uses NaI(Tl) crystal chips or pieces. This work has been directed to constructing a nuclear detector that would not only detect nuclear radiation but would also measure the energy of the incident radiation. The detector is reported to be made of NaI(Tl) chips of rigid uniform size (range mm) with no solvent added. The advantage of the detector is its inexpensive construction and the feedom to fabricate it to any irregular size. The principle under which the detector apparently works is that with a rigid control and construction of like size dimensioned crystals the energy response for each crystal is equal and uniform and therefore additive. While this detector system represents an improvement and does possess some energy resolution capabilities compared to previously reported multicrystalline scintillation detectors, its performance is far less than the response of a single crystal detector of equal size and volume.

As has been descrbied heretofore, it has not been possible to use multi-inorganic scintillation crystal pieces to advantage as a single crystal detector because energy detection and resolution vary for each crystal piece resulting in a non-additive response for each small crystal. What occurs is that each small single crystal produces Compton and photoelectric responses to the incident radiation. As a result, the spectrum of energy detected represents many Compton and photoelectric peaks which are nondiscernible. From such spectra it is not possible to make energy calculations as can be done when a large single high efficiency scintillation crystal is used.

SUMMARY OF THE INVENTION

In accordance with this invention, it has been found that a transfer of excitation energy takes place between multicrystals, of the type described hereinbefore, and photofluorescent cyclic organic compounds. Quite surprisingly, these scintillators act to sum the responses from the multicrystal detector so it responds as a single crystal detector. As a result of this summed energy transfer, the composite crystal detector produces a single Photopeak (total energy capture) and Compton energy (non-total energy capture representing a continuum of detected energy). This invention thus provides a means of constructing a high efficiency multicrystal detector that will detect and measure radiation energy comparable to a large single crystal detector. A multicrystal detector is thus provided which is a combination of random sized, irregular, freshly cleaned crystals which are incorporated indiscriminately in a benzene structured organic scintillator.

BRIEF DESCRIPTION OF THE DRAWING

FIG. 1 is a plot of the response of a single NaI(Tl) crystal detector exposed to a gamma source;

FIG. 2 is a plot of the response of a plastic scintillation detector similarly exposed;

FIG. 3 is a plot of the response of a NaI(Tl) crystal chip detector similarly exposed;

FIG. 4 is a plot of the response of a detector as in FIG. 3 wherein the crystal chips are immersed in mineral oil and similarly exposed;

FIG. 5 is a plot of the response of a detector as in FIG. 3 wherein the crystal chips are immersed in toluene and similarly exposed;

FIG. 6 is a plot of the detector as in FIG. 5 but containing a wavelength shifter and similarly exposed.

DETAILED DESCRIPTION OF THE INVENTION

An important mechanism for the scintillation response of organic molecules is the energy transfer which occurs between solvent molecules and solvent-soluble molecules. The total scintillation procedure in organic scintillators is not well defined and is apparently a combination of energy responses, the primary ones being exciton production, photon emission, resonant energy production and transfer and nonradiant energy exchange through electric dipole interaction.

The inorganic multicrystal-organic compound detector of this invention can best be thought of in terms of a composite response of the inorganic crystals and organic cyclic compounds to incident radiation. If a multicyrstal-organic compound detector, as described herein, is subject to penetrating radiation such as gamma rays, the first response will be that of the cyclic organic compounds which surround and fill the voids between the crystal pieces. This is substantiated by the fact that organic scintillators have a very fast fluorescence response in the nanosec range, a response on the order of $10^2$ faster than the fluorescense response of the inorganic crystals such as NaI(Tl).

Predominantly the initial excitation of the organic scintillator is through the excitation and distortion of the already resonating configuration of the electron cloud of the cyclic compound. This excited energy is transferred throughout the cyclic organic compound at nearly 100 percent efficiency by continued resonant energy transfer between molecules, exciton production, photoemission and nonradiant energy exchange. The crystal pieces also respond to the incoming radiation, by creation of excited states at impurity centers such as created by thallium ions, by absorption of photons, by capture of an exciton or by successive capture of an electron and a hole. This fluorescent response is usually much slower, being near 100 nanosecs. Since it is the slower of the two response times, it can be termed rate controlling fom the total detector.

The mechanism for the initial energy response of the cyclic organic compound and the transfer of this energy to the crystal pieces may be any one or all of the energy transfer systems as described above for the inorganic and organic compounds. How the crystal pieces are able to utilize the energy response from the organic scintillator to increase the crystal fluorescence is not known, but it is evident that the final response of the composite detector, through its quantized energy response, is similar to that of a single crystal.

Several facets of my research give some indications of how the energy transfer occurs within the detector. These are the use of a secondary wave shifter and the effect of active gases in the organic component of the detector. A secondary wave shifter increases the response of the composite crystals. This response indicates that a direct photointeraction does exist between the crystal pieces and the organic component of the detector, and that it is of major importance in this energy transfer. A secondary energy transfer mechanism appears to exist by a direct interaction of excited organic molecules with the crystal pieces. Indication of the presence of this direct transfer is the improved response of the detector when energy-quenching gases such as oxygen are removed from the organic scintillator prior to its use in the detector. For this reason the liquid and/or solid organic scintillators should be free of energy-quenching dissolved gases, such as oxygen.

The inorganic crystals used in the detector of this invention may be of any size or configuration. Their size can range from a millimeter in length to several inches and larger in their longest dimensions. The crystals can be of uneven irregular configuration, or cubic pieces as broken from a larger crystal. Crystal surfaces must be cleansed of all oxides or hydrated compounds to allow maximum optical transparency and to enhance energy transfer from the organic component to the crystals. Cleaning the crystals can be carried out by scraping off the exterior degraded surface in an inert atmosphere or by washing with anhydrous organic compounds such as methanol or benzene, or by a combination of both methods. The crystals must be retained in an inert atmosphere prior to immersion in the organic component of the detector to prevent these surfaces from being contaminated, resulting in lower efficiency of the detector. Since the crystal pieces must be free of oxides and hydrates, it is quite clear that the organic scintillator must sufficiently cover the pieces so that they are not subject to atmospheric contaminants. Thus, the photofluorescent cyclic organic compound must not only fill the voids, but it must also blanket the crystal surfaces. The amount obviously depends upon void spaces, and therefore depends upon crystal orientation. There is, however, no improvement in detection and energy resolution when the organic component occupies above 50 percent of the volume of the whole.

The randomly arranged inorganic crystal pieces may be covered with various organic scintillator matrices having a cyclic molecular structure favorable to fluorescence in response to gamma radiation, particularly aromatic polycyclic scintillators which, under excitation by gamma radiation, emit light with emission bands in the 3,000 to 5,000 Angstrom wavelength range. Desirably organic liquid and plastic or solid scintillators used in the multicrystal detector must not only have good energy transfer properties, but high photon emitting efficiency and low optical density at wavelengths corresponding to the emission spectra of the crystal.

Scintillators useful as the matrix for the crystal pieces include most known organic scintillation crystals having a plurality of aromatic rings. These include polynuclear aromatic compounds having at least two aromatic rings, such as anthracene, naphthacene, pentacene, hexacene, phenanthrene, chrysene, picene, 1,2,5,6-dibenzanthracene, 2,3,6,7-dibenzphenanthrene, pyrene, fluoranthene, fluorene, dibenzo-fluorene, dinaphtho-fluorene, carbazole, naphthophenocarbazole, diphenylene oxide, and the like or mixtures of the aforesaid compounds. Other useful scintillators include naphthalene, diphenyl naphthalenes, beta-methyl naphthalene, dimethyl naphthalene or the like used alone or in admixture with one or more of the other aforesaid scintillators. The preferred polynuclear aromatic scintillating compounds are condensed polynuclear hydrocarbons or heterocyclic compounds having 3 to 6 or more aromatic rings, the term "condensed" indicating that at least two of the rings have carbon atoms in common, as in anthracene, naphthacene, phenanthrene, fluoranthene, fluorene, and carbazole.

Excellent results are also obtained using organic scintillators having benzene rings connected together or separated by aliphatic chains, particularly aliphatic chains with conjugated double bonds. These useful scintillators for the matrix include biphenyl, M-terphenyl, p-terphenyl, p,p'-quaterphenyl, quinquephenyl, sexiphenyl, trans-stilbene, diphenyl ethane, diphenyl butane, 1,4-diphenyl-1,3-butadiene, 1,1',4,4'-tetraphenyl, 1,3-butadiene, diphenyl hexatriene, diphenyl acetylene, diphenyl stilbene, and the like and various mixtures of the aforesaid compounds. All of the aforesaid organic compounds must be able to transmit photoluminescence and must be in a relatively pure condition.

The organic scintillators mentioned above which are preferred and usually most efficient are those that contain 3 or more and preferably 4 to 6 aromatic or heterocyclic rings linked together in a manner that allows continuous conjugation throughout the molecule. While some of the best organic fluors disclosed herein for use in the present invention as primary and/or secondary solutes are thiazoles, oxadiazoles, thiadiazoles or the like, it will be understood that many other organic fluors are suitable having a heterocyclic nucleus other than an oxazole or oxadiazole nucleus as disclosed, for example, on pages 105 and 106 of "Liquid Scintillation Counting" by Carlos G. Bell and F. Newton Hayes, published 1958 by Pergamon Press. The heterocyclic nucleus may be a five-membered or six-membered ring containing up to 4 and preferably 1 to 2 atoms selected from the group consisting of oxygen, nitrogen and sulfur.

Good results may also be obtained where the organic scintillator for matrix is a polymer of an alkenyl benzene or other polyvinyl resin having recurring aromatic groups, such as polymers of vinyl benzene or lower-alkyl-substituted alkenyl benzenes, preferably having one to two or more alkyl groups with 1 to 4 carbon atoms and more preferably one or two methyl groups. For example, the matrix may be formed by polymerizing a monomer such as styrene, methylstyrene, ethylstyrene, 2,4-dimethyl styrene, 2,5-dimethyl styrene, 3,4-dimethyl styrene, 4-iodostyrene, monochlorostyrenes, or the like or mixtures thereof. Thus, both homopolymers and copolymers suitable for use in the present invention can be synthesized from these monomers. They can, for example, be copolymerized with divinyl benzene, various crosslinking agents, and monomers such as vinyl naphthalene, vinyl carbazole, diphenyl butadiene, diphenyl hexatriene, vinyl furan, ethylene, stilbene, propylene and the like. In making copolymers for use in the matrix, it is desirable to minimize the use of monomers not possessing resonance energy, but it will be apparent that substantial amounts of such monomers can usually be included so long as they constitute a minor proportion by weight, it being understood that their amount preferably does not exceed twenty percent of the total polymer by weight. These should, of course, have little or no quenching effect so that the copolymer has effective scintillating properties. In the preparation of the polymers it should be kept in mind that low temperature polymerization and high molecular weight composition are preferred.

The specific monomers mentioned above as suitable for making a polymeric matrix and also the various organic scintillating compounds disclosed herein may be replaced in whole or in part by similar compounds, isomers, homologues, etc., and may have lower alkyl substituents and other substituents which do not significantly affect scintillation properties or do not affect them adversely, such as alkoxy groups or phenyl groups. This is particularly true as to the mono-substituted derivatives.

Examples of liquid scintillators are benzene, toluene, p-xylene, m-xylene, o-xylene, phenyl cyclohexane, ethylbenzene, triethylbenzene, n-butylbenzene, anisole, mesitylene, cymene, p-cymene, dimethoxybenzene, etc. Other ring compounds, although possessing different resonance energy levels than benzene, are nevertheless also suitable, for instance, naphthalene, furan, pyrole, oxazole, oxadiazole and indole compounds. Examples of such compounds are 1-naphthyl, diphenyl-oxazole, 2-(1-naphthyl)-oxazole, 2-phenyl-5-(4-biphenyl)-1,3,4-oxadiazole and similar compounds.

SPECIFIC ILLUSTRATIONS

In the fabrication of the multicomponent detector of the invention, cleaned crystal pieces are immersed and covered by the cyclic organic liquid, or molten solid scintillating compound. This material is then encapsulated in a metal container, usually aluminum, which has a reflector material on all inside surfaces except one face. A photomultiplier (P. M.) tube is optically coupled to the unreflected side of the container. Radiation energy impinging on the detector penetrates the aluminum shield and reflector material and interacts with the crystal-solvent detector material. The photons that are produced within the detector are reflected off the sides of the container coated with reflector material and impinge on the P. M. tube. The photon energy is then recorded by the P. M. tube as an electrical pulse. The photon production of the detector is directly related to the number and energy of the impinging radiation.

The detector components, the reflector, aluminum container and photocoupled P. M. tube constitute the total detection system. The detector has high voltage applied to it (approximately 1,000 volts) to operate the P. M. tube. Pulses originating from the P. M. tube are amplified in a preamplification stage which shapes the pulses and matches them for additional amplification by means of an amplification stage. The pulse is then fed into a pulse height analyzer which can discriminate sizes of the pulses and relate them to their energy. Operation of the detector for detecting nuclear radiation is brought about by placing the nuclear source on top, beside or in the near vicinity of the detector in such a manner that the radiation energy can impinge upon the detector.

This invention is perhaps best exemplified by an explanation of data which was collected on the multicomponent nuclear energy detector of the invention. Six detectors were fabricated all of equal volume but composed of different detector materials. These were a single large NaI(Tl) crystal, a pure scintillation plastic, NaI(Tl) crystal pieces, i.e., chips, NaI(Tl) crystal pieces in mineral oil, NaI(Ti) chips in toluene and NaI(Tl) chips in toluene with added wave shifters. All of the detectors were attached to photocubes which could be connected to a pluse height analyzer. Response of the detectors when exposed to gamma radiation was thus evaluated by measurement of the rate of occurrence end intensity of photon response of the detectors.

Data collected for each detector was obtained by exposing the detector to an incident gamma radiation source — a Cesium 137 source emitting gamma rays, the applied voltage being 1,000 Volts, Gain 428, in each instance. The data was plotted as rate of detected pulses (cts/min) versus amplitude or energy of the signal (million electron volts—MeV).

FIG. 1 shows such a plot of a 2 diameter × 2 inch high single NaI(Tl) crystal detector when exposed to the gamma source. The left side of the graph represents the frequency of lower energy gamma rays detected, the effect of Compton electrons. This represents radiation energy that was only partially detected by the crystal detector. The peak represents the effect of photoelectrons, and represents the gamma rays that were totally captured by the detector. Since all gamma rays are emitted at discrete energy levels, the photoelectrons, represented by the detection of the equal energy gamma rays, have equal intensity and cluster together forming the photopeak. The importance of the photopeak is that the average energy value of the peak can be calibrated with known gamma ray standards and used to identify the detected energy. A reference chart of gamma ray energies emitted by known radioisotopes allows identification of radioisotopes according to the measured energy of the radiation. This procedure is called gamma ray spectroscopy. The importance of photoelectron measurement of a detector is paramount for gamma ray spectroscopy and is, therefore, the important criteria for judging a good radiation detector.

FIG. 2 shows the graph of a plastic scintillation (organic) detector when exposed to the same gamma ray source as was used with the single NaI(Tl) crystal detector. No photopeak is evident, only a Compton electron continuum. Therefore, the plastic scintillation detector does not meet the requirements of a good gamma ray detector.

FIG. 3 shows the response of a detector made of crystal chips of NaI(Tl). Poorly discernible photopeaks and associated Compton electron continuums are evident. This detector is a very poor detector.

FIG. 4 shows results of the same NaI(Tl) crystal chips but immersed in mineral oil. A very broad poorly defined photopeak is evident. This detector is also poor since it would be difficult to evaluate with any accuracy the average energy of the photoelectrons spread over such a wide distribution.

FIG. 5 shows a similar NaI(Tl) crystal chip detector's response to gamma radiation when toluene covers and fills the voids between the chips. A very improved photopeak is shown which does allow calculation of the photopeak energy. This peak is slightly moved to a lower energy level, relative to the single NaI(Tl) crystal detector peak, but it is a particularly good detector, responding in proportion to gamma ray energies detected.

FIG. 6 shows the same detector as FIG. 5, but with a wavelength shifter dissolved in the toluene liquid. The photopeak is sharper and slightly moved to a higher energy level similar to the single crystal response. This detector is a superior gamma ray detector, since its photoelectrons fall in a narrow energy range producing a sharp photopeak which allows an accurate gamma ray spectroscopy to be carried out.

The use of the detector provided herein thus has the advantage of producing a single photopeak, as in the case of a single large crystal. Indeed detectors can be provided herein with responses which rank in efficiency with the single sodium detector. In addition, they have many advantages such as cheaper cost, easier detector fabrication, and greater detector durability to shock and temperature change. This detector also can measure rate (intensity) and energy of impinging radiation.

It should be pointed out that the organic liquids or solids are not solvents for the crystal pieces, but only act to collect and transfer energy from one crystal to another and to provide low optical density so that the emitted photons can be transmitted from the crystals to a sensing phototube. Orientation of the crystal pieces in the detector requires no specific arrangements, although placement so as to minimize voids between adjacent crystal pieces is desirable. As indicated hereinbefore, this makes possible the use of less photofluorescent cyclic organic compound to cover the inorganic crystal pieces.

Given the teachings of this invention, various modifications will occur to those skilled in the art. Thus, monomers employed in the preparation of scintillation plastics can be purged of any active gases with an inert gas as are liquid organic scintillators. High purity compounds should be employed. It will be appreciated that all organic cyclic compounds will not necessarily give the same results in combination with all of the inorganic crystals in the form of pieces. Whereas a single peak will result in each instance, the intensity will vary from combination to combination.

I claim:

1. A high efficiency scintillation detector composition especially suitable for use as an integral component of a scintillation counter consisting essentially of the combination of
   a. a multiplicity of crystal pieces of an alkali metal halide activated with thallium, and
   b. a liquid organic benzene-ring compound having molecular ring structures favorable to energy transfer selected from the group consisting of benzene, toluene, o-xylene, m-xylene, p-xylene, phenyl cyclohexane, ethyl benzene, triethylbenzene, n-butylbenzene, anisole, mesitylene, p-cymene, and dimethoxybenzene,
   the crystal pieces of (a) being broken or whole crystals in the size range of from a millimeter to over an inch in their longest dimensions and being indiscriminately incorporated in said organic compound, the quantity of said crystals being at least fifty percent by volume of the whole, and the quantity of organic compound being less than fifty percent by volume of the whole being sufficient to cover the inorganic crystal pieces so as to effect an energy transfer interaction between the organic molecules and the crystal pieces whereby incident radiation is resolved into a single composite spectrum in proportion to the amount and intensity of incident radiation energy impinging thereupon.

2. The detector of claim 1 wherein the alkali metal halide is sodium iodide and the liquid organic compound is benzene.

3. The detector of claim 1 wherein the alkali metal halide is sodium iodide and the liquid organic compound is toluene.

4. The detector of claim 1 wherein the alkali metal halide is sodium iodide and the liquid organic compound is p-xylene.

5. A high efficiency scintillation detector composition esepecially suitable for use as an integral component of a especially counter consisting essentially of a multiplicity of alkali halide, thallium activated crystal pieces embedded in and distributed through a solid plastic scintillator compound polymerized or copolymerized from aromatic monomers selected from the group consisting of styrene, vinyl toluene, dimethylstyrene and vinyl containing monomers wherein said last-mentioned vinyl monomer does not exceed twenty percent by weight of the total polymer, the quantity of said crystal being at least fifty percent by volume of the whole, and the quantity of plastic scintillator being less than fifty percent by volume of the whole but sufficient to cover and encapsulate the inorganic crystal pieces so as to effect an energy transfer interaction between the organic molecules and the crystal pieces whereby incident radiation is resolved into a single composite spectrum in proportion to the amount and intensity of incident radiation energy impinging thereupon.

6. The detector of claim 5 wherein the alkali metal halide is sodium iodide and the solid plastic compound is polystyrene.

7. The detector of claim 5 wherein the alkali metal halide is sodium iodide and the solid plastic compound is polyvinyl toluene.

8. A high efficiency scintillation detector composition especially suitable for use as an integral component of a scintillation counter consisting essentially of a multiplicity of alkali halide, thallium activated crystal pieces embedded in and distributed through a polynuclear aromatic organic scintillator consisting essentially of at least two aromatic rings, said crystal pieces occupying at least fifty percent by volume of the whole, and said organic scintillator being less than fifty percent by volume of the whole but being sufficient to cover and encapsulate the inorganic crystal pieces so as to effect an energy transfer interaction between the organic molecules and the crystal pieces whereby incident radiation is resolved into a single composite spectrum in proportion to the amount and intensity of incident radiation energy impinging thereupon, such crystal pieces having freshly cleaned surfaces and the organic scintillator being of high purity.

\* \* \* \* \*